United States Patent [19]

Cowles et al.

[11] Patent Number: 4,590,296

[45] Date of Patent: May 20, 1986

[54] PROCESS FOR SEPARATION OF BETA-ACIDS FROM EXTRACT CONTAINING ALPHA-ACIDS AND BETA-ACIDS

[75] Inventors: John M. Cowles, Whitefish Bay; Henry Goldstein, Brookfield; Etzer Chicoye, Milwaukee; Patrick L. Ting, Brookfield, all of Wis.

[73] Assignee: Miller Brewing Company, Milwaukee, Wis.

[21] Appl. No.: 573,801

[22] Filed: Jan. 25, 1984

[51] Int. Cl.$^4$ .............................................. C07C 45/80
[52] U.S. Cl. ..................... 568/366; 426/600; 568/377; 568/315; 568/318; 568/344; 568/341; 568/347
[58] Field of Search ............... 568/315, 318, 344, 341, 568/366, 377; 426/600

[56] References Cited

U.S. PATENT DOCUMENTS

| | | | |
|---|---|---|---|
| 3,536,495 | 10/1970 | Fly et al. | 568/366 |
| 3,552,975 | 1/1971 | Worden et al. | 99/505 |
| 3,892,808 | 7/1975 | Mitchell | 568/366 |
| 3,923,897 | 12/1975 | Worden | 260/586 |
| 4,002,683 | 1/1977 | Todd, Jr. | 260/586 |
| 4,013,721 | 3/1977 | Reininger et al. | 568/344 |
| 4,088,688 | 5/1978 | Sigg-Grütter et al. | 260/586 |
| 4,160,787 | 7/1979 | Moll et al. | 568/341 |
| 4,234,516 | 11/1980 | Koller et al. | 568/341 |
| 4,247,483 | 1/1981 | Baker et al. | 568/366 |
| 4,395,431 | 7/1983 | Lance et al. | 426/600 |

FOREIGN PATENT DOCUMENTS 1266716  3/1972  United Kingdom ............... 568/366

OTHER PUBLICATIONS

"The Merck Index", pp. 688 and 802, #4651 and 5424 (1983).

*Primary Examiner*—James H. Reamer
*Attorney, Agent, or Firm*—Quarles & Brady

[57] ABSTRACT

Beta-acids are separated from alpha-acids in a hop extract without using organic solvents by bubbling $CO_2$ through an aqueous hop extract having a pH of about 9.6 to about 13 to lower the pH to about 8.5 to about 9.5 to precipitate the beta-acids and leave the alpha-acids in the extract.

3 Claims, No Drawings

PROCESS FOR SEPARATION OF BETA-ACIDS FROM EXTRACT CONTAINING ALPHA-ACIDS AND BETA-ACIDS

FIELD OF THE INVENTION

The present invention relates to bittering agents for flavoring beer and other beverages. More particularly, it relates to a method of preparing tetrahydroisohumulones which are known bittering agents.

DESCRIPTION OF THE PRIOR ART

Tetrahydroisohumulones are light-stable FDA-approved bittering agents which can be used to add a hop flavor to beer. They may be prepared from alpha-acids (or humulones) but preferably are prepared from the beta-acids (or lupulones) in hop extracts. The beta-acids are normally discarded.

In the Worden et al. U.S. Pat. No. 3,552,975 a method is disclosed employing organic solvents and lead salts to make tetrahydroisohumulones from beta-acids. The final product is a crude mixture from which the residues of lead can only be removed with great difficulty.

In the Worden U.S. Pat. No. 3,923,897 a process for preparing tetrahydroisohumulones is disclosed which involves the oxidation of desoxytetrahydrohumulones with a peracid followed by isomerization of the resulting tetrahydrohumulones. The process does not utilize lead salts but it is conducted in organic solvents and it involves cumbersome solvent changes which increase process cost. The presence of even residual amounts of organic solvents in food products such as beverages is undesirable. Therefore, it would obviously be desirable to have a method of making tetrahydroisohumulones which does not employ objectionable organic solvents. The use of ethanol and water, the major components of beer, would be ideal.

SUMMARY OF THE INVENTION

It is an object to the present invention to disclose a method of preparing tetrahydroisohumulones from beta-acids without using water immiscible organic solvents.

It is a further object to disclose a method of preparing tetrahydroisohumulones from beta-acids by a method which uses only ethanol and water as solvents and hydrogen and oxygen as the reactive agents.

In the practice of the method of the present invention beta-acids dissolved in an acidified lower alcohol having 1 to 3 carbon atoms, preferably ethanol, are treated with hydrogen in the presence of a hydrogenation catalyst to form desoxytetrahydrohumulones. The desoxytetrahydrohumulones are then dissolved in an aqueous, alcoholic caustic solution and oxidized and isomerized by treatment with an oxygen-containing gas in the presence of an effective amount of metal ions, preferably magnesium ions, which catalyze the isomerization to form the desired tetrahydroisohumulones.

The product obtained has substantially the same desirable properties as commercially available tetrahydroisohumulones which are made by the prior art methods using objectionable organic solvents.

DESCRIPTION OF THE PREFERRED EMBODIMENT

In the preferred practice of the present invention the tetrahydroisohumulones are prepared from beta-acids by dissolving the beta-acids in ethanol having a sulfuric acid concentration of 0.2 to 0.6 M and treating the beta-acids with hydrogen in the presence of a 3% palladium on carbon catalyst to form the corresponding desoxytetrahydrohumulones. The desoxytetrahydrohumulones are dissolved in a caustic aqueous ethanol solution having a pH of about 8 to about 12 which contains magnesium ions, preferably about 0.75 to about 3 moles of magnesium chloride per mole of desoxytetrahydrohumulones. An oxygen-containing gas is then bubbled through the aqueous alcoholic caustic solution, which is stirred and heated to about 50° C.–60° C. until the desoxytetrahydrohumulones are oxidized and isomerized to the desired tetrahydroisohumulones. The oxidation and isomerization reactions are usually complete in about 30 minutes using oxygen or in about 90 minutes using air. The reaction mixture is then acidified to a pH of about 1, thoroughly agitated, the alcohol is removed by distillation and the resulting layers which form are readily separated to obtain an orange oil composed primarily of cis- and trans-tetrahydroisohumulones.

The method of the present invention may be illustrated as follows:

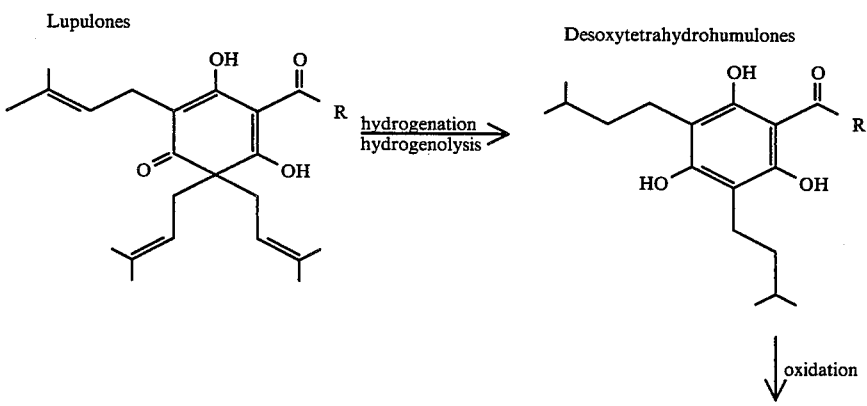

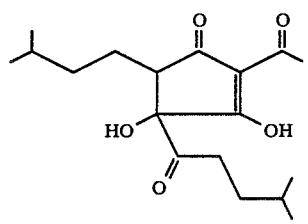 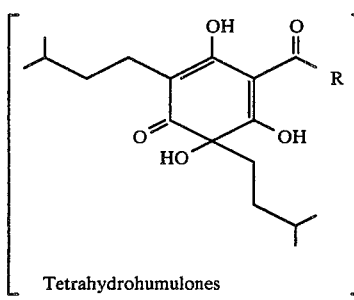

Tetrahydroisohumulones     Tetrahydrohumulones in which R is isopropyl, sec-butyl or isobutyl.

The practice of the invention is further illustrated by the following examples:

EXAMPLE 1

Separation of $CO_2$ Hop Extract into Alpha- and Beta-Acid Fractions Using No Organic Solvents One volume of whole $CO_2$ hop extract was extracted with one equivalent of potassium hydroxide (per equivalent of alpha-acids) in two volumes of water. The mixture was stirred at 50°–55° C. for 15 minutes, and the aqueous solution of alpha-acids was separated from the oil layer which contained the remainder of the alpha-acids, all of the beta-acids, and the hop oils and waxes originally present in the whole $CO_2$ hop extract.

Following the initial extraction, in which at least 80% of the alpha-acids initially present in the whole $CO_2$ hop extract were recovered in the aqueous layer, a second extraction was performed on the light phase from the first extraction. In this case, one volume of the light phase was stirred with 1.5 equivalents of potassium hydroxide (per equivalent of the remaining alpha-acids) in two volumes of water to afford an aqueous layer containing a maximum of 20% of the alpha-acids initially present in whole $CO_2$ hop extract and a maximum of 20% of the beta-acids contained in the original light phase. The new light phase from the second extraction contained only beta-acids, hop oils and waxes. The beta-acids can be separated from both the aqueous and light phases of this second extraction.

EXAMPLE 2

Isolation of Beta-Acids From the Aqueous Phase of the Second Extraction Using No Organic Solvents To a mechanically-stirred solution of 1 liter of the aqueous layer from the second extraction of whole $CO_2$ hop extract of Example 1 was added 500 ml of water. A gas dispersion tube and pH electrode were placed in the flask, and $CO_2$ was bubbled into the solution at a flow rate of 50 ml/min. The initial pH was between 9.9 and 9.6; a pH value of 8.5 was reached in 1.5 h at this flow rate.

The gas flow was discontinued when the pH reached a value of 8.5, and the mixture was agitated for an additional ten minutes. The solid beta-acids were then separated from the aqueous solution of alpha-acids.

In a usual run, a pale yellow solid and a light brown clear solution were obtained. Analysis of the product showed 3 to 5% alpha-acids, and 0.2% beta-acids by weight in the aqueous solution and 78–88% beta-acids in the solid material.

The solid fraction was dried, producing a fine yellow powder which was $\geq 90\%$ beta-acids and suitable for use in the method of the present invention.

EXAMPLE 3

Isolation of Beta-Acids From the Light Phase of the Second Extraction (Using Hexane):

To a mechanically-stirred slurry of 600 g of the light phase from the second extraction of whole $CO_2$ (Bullion) hop extract was added one liter of 1N potassium hydroxide. The mixture was stirred for 15 minutes at 25° C., and the phases were allowed to separate. The upper dark brown layer containing hop oils and waxes was discarded, and the aqueous phase was acidified to pH 1 with 50% sulfuric acid. After acidification, one liter of hexane was added, and the two-phase system was stirred and heated to 50° C. to dissolve all solids. After discarding the aqueous layer, the beta-acids were allowed to crystallize from the hexane solution. Collection of the crystals yielded 150 to 200 g (more if other hop varieties were used for stock $CO_2$ extract) of the beta-acids in the form of a solid suitable for use as a starting material in the method of the present invention.

EXAMPLE 4

Isolation of Beta-Acids From the Light Phase of the Second Extraction (Using No Organic Solvents):

To a mechanically-stirred slurry of 600 g of the light phase from the second extraction of whole $CO_2$ hop extract of Example 1 was added 1 liter of 1N KOH. The mixture was ( stirred at 25° C. for 15 minutes, and the phases were allowed to separate. As before, the upper dark brown layer was discarded; the aqueous phase (1200 ml) was diluted with 1.5 volumes of water to 3 liters total.

A gas dispersion tube and pH electrode were placed in the flask, and $CO_2$ was bubbled into the solution; stirring was continued during all operations. The initial pH was about 13.0. At a $CO_2$ flow rate of 50 ml/min, a pH of 10.0 was reached in less than 2 hours.

The gas flow was discontinued when the pH reached a value of 9.5; the solid was then collected.

Two hundred grams of solids were obtained. Analysis of the product showed 0% alpha-acids, 80% beta-acids, and 15% water.

The solid product obtained was suitable for use as a starting material in the method of the present invention.

EXAMPLE 5

Reduction of the Beta-Acids 50 grams of the beta-acids prepared by the process of Example 4 were dissolved in 250 ml of ethanol to which was added 3.5 ml of concentrated sulphuric acid (to give a pH meter reading of 1 or less) and 5 grams of 3% palladium on carbon. The mixture was stirred at an initial temperature of 40° C. under 10 psig of hydrogen. The temperature rose during the course of the reaction to about 47° C. When the absorption of hydrogen ceased after 60 minutes the stirring was stopped. Filtration and washing of catalyst with 50 ml of ethanol afforded a clear yellow solution of desoxytetrahydrohumulones.

EXAMPLE 6

Oxidation and Isomerization of Desoxytetrahydrohumulones

To the clear yellow acidified ethanol solution obtained by the procedure of Example 5 was added 25 grams of $MgCl_2.6\ H_2O$ and a solution of 15 grams of KOH in 300 of water. The mixture had a pH of about 9.5. The mixture was mechanically stirred and oxygen was bubbled through the mixture in the flask through a gas dispersion tube. The reaction mixture was heated from 25° C. to 60° C. during the gas addition time of 30 minutes. The ethanol was removed by distillation under reduced pressure until the volume of the mixture was reduced by 300 ml. Acidification to a pH of 1 with 50% sulphuric acid was followed by thorough agitation. Separation of the layers which formed was surprisingly easy to accomplish and afforded 42 grams of a pale orange oil. Alternatively, the acidification and ethanol removal steps may be reversed. The product was shown to be a mixture of cis- and trans- tetrahydroisohumulones by HPLC, mass spectrometry, ultraviolet and NMR spectroscopy. Overall yield for Examples 5 and 6 was 93%.

EXAMPLE 7

The procedure of Example 6 was repeated except that air was bubbled through the reaction mixture in place of oxygen for about 90 minutes. The tetrahydroisohumulones obtained were substantially identical to those of Example 6.

In Table 1 the results of a number of representative runs employing the method of the present invention are recorded. Many more runs were carried out with similar results.

TABLE 1

Representative Reaction Runs from the Aqueous Ethanolic Tetrahydroisohumulone Process

| RUN # | HYDRO-GENATION | | | OXIDA-TION | | END PRODUCT |
|---|---|---|---|---|---|---|
| | $H_2$ Pressure | Time (min) | Base for pH Adj. | Oxidant | Time (min) | Crude Yield (%) |
| 1 | 5 psig | 45 | NaOH | $O_2$ | 55 | 91 |
| 2 | 5 psig | 40 | NaOH | $O_2$ | 60 | 84 |
| 3 | 5 psig | 50 | NaOH | $O_2$ | 40 | 88 |
| 4 | 5 psig | 40 | KOH | $O_2$ | 40 | 88 |
| 5 | 1 atm | 55 | KOH | $O_2$ | 35 | 100 |
| 6 | 1 atm | 60 | KOH | $O_2$ | 30 | 93 |
| 7 | 1 atm | 60 | KOH | Air | 90 | 93 |

The foregoing examples have been for purpose of illustration and a number of changes can be made without departing from the spirit and scope of the present invention.

In the hydrogenation step, for example, in place of a 3% palladium on carbon hydrogenation catalyst, catalysts may be used containing from about 1% by weight to about 10% palladium on carbon. The use of more catalyst has little effect other than a shorter reaction time. Other catalysts that can be used under mild hydrogenation conditions such as palladium on alumina and platinum catalysts also may be used. In addition, instead of using sulphuric acid to acidify the hydrogenation mixture to a pH meter reading of about 1 or less, other acids such as hydrochloric acid have been used.

The pressure of the hydrogen gas during the hydrogenation may be different than the 10 pisg used in Example 5. Preferably, pressures between one atmosphere (0 psig) and 10 psig are used. Slight increases in the overall reaction time are noted if the pressure is decreased from 10 to 5 psig and finally to atmospheric flow-through conditions. However, the exothermic reaction will usually be complete in 75 minutes or less even when low pressure conditions including atmospheric pressure are employed. Low hydrogen pressures and acidification of the hydrogenation mixture minimize the formation of undesired hexahydrolupulones.

The presence of magnesium ions in the reaction mixture during the oxidation-isomerization step is preferred in order to suppress the formation of humulinic acids. However, other metal ions that catalyze the isomerization reaction, such as calcium, may be used in place of magnesium.

Although the oxygen-containing gas used in the oxygenation step may be either pure oxygen or air, the use of air is preferred because it minimizes the production of an impurity which appears to be dihydrohumulinic acid.

It will be apparent to those skilled in the art that a method of converting beta-acids to tetrahydroisohumulones has been described which is superior to the prior art methods because it avoids the use of objectionable organic solvents and other toxic reagents. The method of the present invention employs only water and ethanol as solvents, thus there is no problem of organic solvent residues in the final product. The use of hydrogen and oxygen as reactive agents also insures that there will not be toxic residues in the final products.

It is intended that the invention not be limited by the foregoing description but only by the claims which follow.

We claim:

1. A method of separating beta-acids from alpha-acids in a hop extract containing beta-acids and alpha-acids without using organic solvents, said method consisting of the hop extract having a pH of about 9.6 to about 13 by bubbling $CO_2$ through the extract to lower the pH to about 8.5 to about 9.5 to precipitate the beta-acids and then isolating the pure solid beta-acids from the pure alpha-acids which remain in the aqueous extract.

2. Beta-acids, free of organic solvents, when prepared by the method of claim 1.

3. An aqueous extract containing pure alpha-acids, free of organic solvents, when prepared by the method of claim 1.

* * * * *